No. 732,794. PATENTED JULY 7, 1903.
A. STANLEY.
QUEEN CELL SHIELD AND QUEEN BEE NURSERY.
APPLICATION FILED NOV. 12, 1902.
NO MODEL.
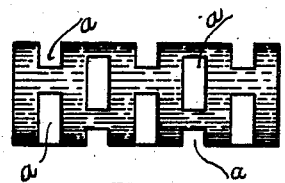
Fig. 1.
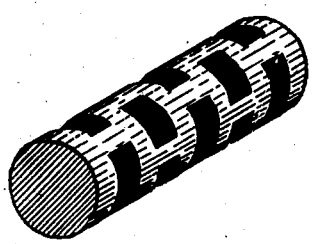
Fig. 2.
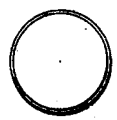      
Fig. 3.   Fig. 4.   Fig. 5.
WITNESSES:
John B. Dornblaser
Frank Stephan
INVENTOR
Arthur Stanley
BY John B. Erwin,
ATTORNEY No. 732,794.

Patented July 7, 1903.

UNITED STATES PATENT OFFICE.

ARTHUR STANLEY, OF LEE COUNTY, ILLINOIS.

QUEEN-CELL SHIELD AND QUEEN-BEE NURSERY.

SPECIFICATION forming part of Letters Patent No. 732,794, dated July 7, 1903.

Application filed November 12, 1902. Serial No. 131,043. (No model.)

*To all whom it may concern:*

Be it known that I, ARTHUR STANLEY, a citizen of the United States, residing in the county of Lee and State of Illinois, have invented a new and useful Improvement in Queen-Cell Shields and Queen-Bee Nurseries, of which the following is a specification.

My invention relates to improvements in queen-cell shields and queen-bee nurseries; and it consists in a zinc cylinder preferably two inches in length, with diameter of three-fourths of an inch, the zinc from which cylinder is made being punched so that rectangular apertures are made therein, the altitude of which rectangle is seventeen-hundredths of an inch; and it further consists in adjustable plugs for ends of cylinder, of wood or other substance, preferably a wad, as used in a gun.

The object of my invention is to inclose and separate the queen-cells, that their destruction by the queen bees and other bees caused to take such action by the first hatched queen bee in her campaign of destruction for supremacy, and to provide openings in such queen-cell shields and queen-bee nurseries through which worker bees may enter and reach inclosed cell and perform the final work of thinning the outer wall of cell, to make more certain the hatching and liberating of the queen and for the sustaining and fostering and feeding of young queens by the worker bees and avoiding the necessity of artificial feeding and furnishing of food for such queens while so engaged and inclosed and for the safe and more practical and acceptable way of introducing a queen into a hive or transferring queen for shipping or handling.

I obtain the objects by the mechanism illustrated in the accompanying drawings, in which—

Figure 1 is a side elevation of the queen-cell shield and queen-bee nursery. Fig. 2 is a perspective view of same. Fig. 3 is an end view of same. Fig. 4 is a side view of plug. Fig. 5 is an edge view of plug.

From a piece of zinc into which apertures rectangular in shape with altitude of seventeen-hundredths of an inch and base preferably one-half inch are punched a, Fig. 1, cylinder is made with a diameter preferably three-fourths of an inch, as shown in Figs. 1 and 2. From wood or other substance plugs are made for the ends of cylinder, (I prefer ring a wad such as is used in guns,) as is shown in Fig. 4, and the edge view of which is shown in Fig. 5, which said plugs are adjustable within said cylinder and removable therefrom.

For the practical and useful application of my invention one of the plugs is removed, and upon it is builded an artificial cell-cup, which is then attached to a frame and placed in hive, where it remains until the bees draw the cell out and complete and seal the cell. At this stage the plug with sealed cell attached is detached from frame and placed cell first into queen-cell shield and queen-bee nursery, when queen-cell shield and queen-bee nursery is placed in a frame or suspended in the hive, where the workers will care for such cell, having access to same through the apertures a, Fig. 1, and will feed and care for queen when hatched, being able to reach her through said apertures.

The apertures, as hereinbefore stated, having altitude of seventeen-hundredths of an inch brings about the imprisoning of the queen hatched within my queen-cell shield and queen-bee nursery and excludes queen bees that may be without, thus avoiding destruction of queen cell and queen, these apertures thus provided permitting entrance of workers to care for and feed queen within my queen-cell shield and queen-bee nursery and does away with the necessity of providing by hand food for such queen.

By virtue of the removable plug a queen may be transferred into another cage or place by placing the end from which plug is removed over other opening and by an adjusting or moving of other plug toward opening through which you desire queen to enter.

For the introduction of a queen into a hive using my invention remove one of the plugs and plug end from which said removal is made with a candy-like substance or food by dipping or pressing the end of my invention into a thin layer of such substance or food and suspend queen-cell shield and queen-bee nursery, imprisoning queen hatched therein between two combs, and the workers and the queen herself will shortly bring about a release by disposing of the food.

Having thus described the said improvement, I claim as my invention and desire to patent under this specification—

1. A queen-cell shield and queen-bee nursery composed of a cylinder made of zinc punched with apertures and with removable and adjustable end plugs, substantially as hereinbefore specified.

2. A queen-cell shield and queen-bee nursery composed of a cylinder made of zinc with rectangular apertures, the altitude of which rectangle is seventeen-hundredths of an inch, and with adjustable and removable end plugs, substantially as hereinbefore specified.

ARTHUR STANLEY.

Witnesses:
JOHN S. DORNBLASER,
FRANK STEPHAN.